United States Patent [19]

Ishimaru et al.

[11] Patent Number: 4,930,743
[45] Date of Patent: Jun. 5, 1990

[54] VIBRATION PROOFING SUPPORT STRUCTURE FOR ENGINE OF VEHICLE

[75] Inventors: Takeshi Ishimaru; Takeshi Kishi, both of Ehime; Shigeo Yoshino, Osaka, all of Japan

[73] Assignee: Iseki & Co. Ltd., Matsuyama

[21] Appl. No.: 285,075

[22] Filed: Dec. 16, 1988

[30] Foreign Application Priority Data

Jan. 20, 1988 [JP] Japan .................................. 63-011742

[51] Int. Cl.⁵ ............................................ F16M 13/00
[52] U.S. Cl. ..................................... 248/638; 180/291
[58] Field of Search ....................... 248/638, 562, 636; 180/312, 291

[56] References Cited

U.S. PATENT DOCUMENTS

| | | | |
|---|---|---|---|
| 1,062,789 | 5/1913 | Morton | 180/312 X |
| 1,211,637 | 1/1917 | Squires | 180/291 X |
| 1,788,878 | 1/1931 | Lee | 180/291 X |
| 1,834,907 | 12/1931 | Trott | 248/638 |
| 1,845,551 | 2/1932 | Mitzl | 248/638 X |
| 2,020,597 | 11/1935 | Appel | 180/291 |
| 2,346,123 | 4/1944 | Willson | 180/291 X |
| 3,089,558 | 5/1963 | Brueder | 180/291 |
| 3,395,769 | 8/1968 | Julien | 180/291 |

FOREIGN PATENT DOCUMENTS

| | | | |
|---|---|---|---|
| 621935 | 5/1927 | France | 180/312 |
| 754509 | 11/1933 | France | 180/291 |
| 62-80128 | 4/1987 | Japan | 180/291 |
| 656885 | 4/1979 | U.S.S.R. | 180/291 |

Primary Examiner—Alvin C. Chin-Shue
Assistant Examiner—Robert A. Olson
Attorney, Agent, or Firm—Arthur T. Fattibene

[57] ABSTRACT

A vibration proofing support structure for engines, capable of preventing the vibrations of an engine from being transmitted to the main frames on which the engine is supported, and improving the twisting strength of the main frames, consisting of left and right main frames provided on both sides of an engine, a connecting frame connecting the left and right main frames together and fixed to the lower surfaces of the front portions of the main frames, rotatable shaft provided at the intermediate portion of the connecting frame and fixing a front axle pivotably thereto, a front lower vibration proofing member provided on the portion of the connecting frame which is above the rotatable shaft, vibration restricting members provided in positions above and substantially crossing the front lower vibration proofing member and above the left and right main frames with clearances left between the restricting members and said main frames and left and right rear vibration proofing members via which the left and right rear portions of the engine are supported in a vibration isolated state on the left and right main frames.

4 Claims, 5 Drawing Sheets

VIBRATION PROOFING SUPPORT STRUCTURE FOR ENGINE OF VEHICLE

BACKGROUND OF THE INVENTION

1. Field of the Invention

This invention relates to a vibration proofing support structure for an engine of a vehicle, and more particularly to a vibration proofing support structure for an engine of a vehicle, provided at the left and right outer side portions thereof with main frames between which an engine is positioned, and capable of substantially preventing the vibrations of the engine from being transmitted to the main frames, and from causing the main frames to be forcibly twisted.

2. Description of the Prior Art

The known vibration proofing support structures for an engine include support structures disclosed in Japanese Patent Laid-Open Nos. 100019/1984 and 81816/1986.

In such conventional support structures, rubber vibration isolators are provided at both side portions thereof which are in front of and at the back of an engine, and the engine is set on main frames via these rubber vibration isolators. Therefore, when the engine is vibrated, the main frames are moved back and forth in accordance with the vibratory movements of the engine.

In these conventional vibration proofing support structures, the main frames are moved with the engine due to the vibrations of the latter. Accordingly, the main frames tend to be moved constantly, and, conversely speaking, it is difficult to prevent the vibrations of the main frames from occurring.

SUMMARY OF THE INVENTION

An object of the present invention is to eliminate these inconveniences of the conventional vibration proofing support structures for an engine. In order to achieve this object, the present invention employs novel technical means. Namely, the vibration proofing support structure for an engine according to the present invention consists of left and right longitudinally extending main frames 2, 2 provided on both sides of an engine 1, a connecting frame 3 used to connect the left and right main frames 2, 2 together and fixed to the lower surfaces of the front portions of the same main frames 2, 2, a rotatable shaft 5 provided at the intermediate portion of the connecting frame 3 and used to fix a front axle 4 pivotably thereto, a front lower vibration proofing member 6 provided on the portion of the connecting frame 3 which is above the rotatable shaft 5, vibration restricting members 7, 7 provided in positions above and substantially crossing the front lower vibration proofing member 6 and above the left and right main frames 2, 2 with clearances A left between the restricting members 7, 7 and main frames 2, 2, and left and right rear vibration proofing members 8, 8 via which the left and right rear portions of the engine 1 are supported in a vibration isolated state on the left and right main frames 2, 2.

The present invention has the following technical effects owing to the above-described construction thereof. The front portion of the engine 1 is swung freely in the longitudinal and lateral directions around the front lower vibration proofing member 6 and does not generate a force for laterally twisting the main frames 2, 2. The left and right side portions of the rear part of the engine 1 are supported in a vibration isolated manner on the left and right main frames 2, 2 via the left and right rear vibration proofing members 8, 8. Accordingly, the vibrations, if any, occurring in the front lower vibration proofing member 6 are restricted by and absorbed into the rear vibration proofing members 8, 8 owing to the vibration isolating force of the latter. Consequently, the vibrations of the engine 1 are transmitted as a force for laterally twisting the main frames 2, 2 via the rear vibration proofing members 8, 8 positioned closer to the rear portion of a vehicle body. Therefore, the present invention is capable of increasing the twisting strength of the main frames 2, 2 and improving the durability thereof as compared with a conventional vibration proofing support structure of this kind.

The above and other objects as well as advantageous features of the invention will become apparent from the following description of the preferred embodiment taken in conjunction with the accompanying drawings.

BRIEF DESCRIPTION OF THE DRAWINGS

The accompanying drawings show an embodiment of the present invention, wherein.

DESCRIPTION OF THE PREFERRED EMBODIMENT

Figure 1:
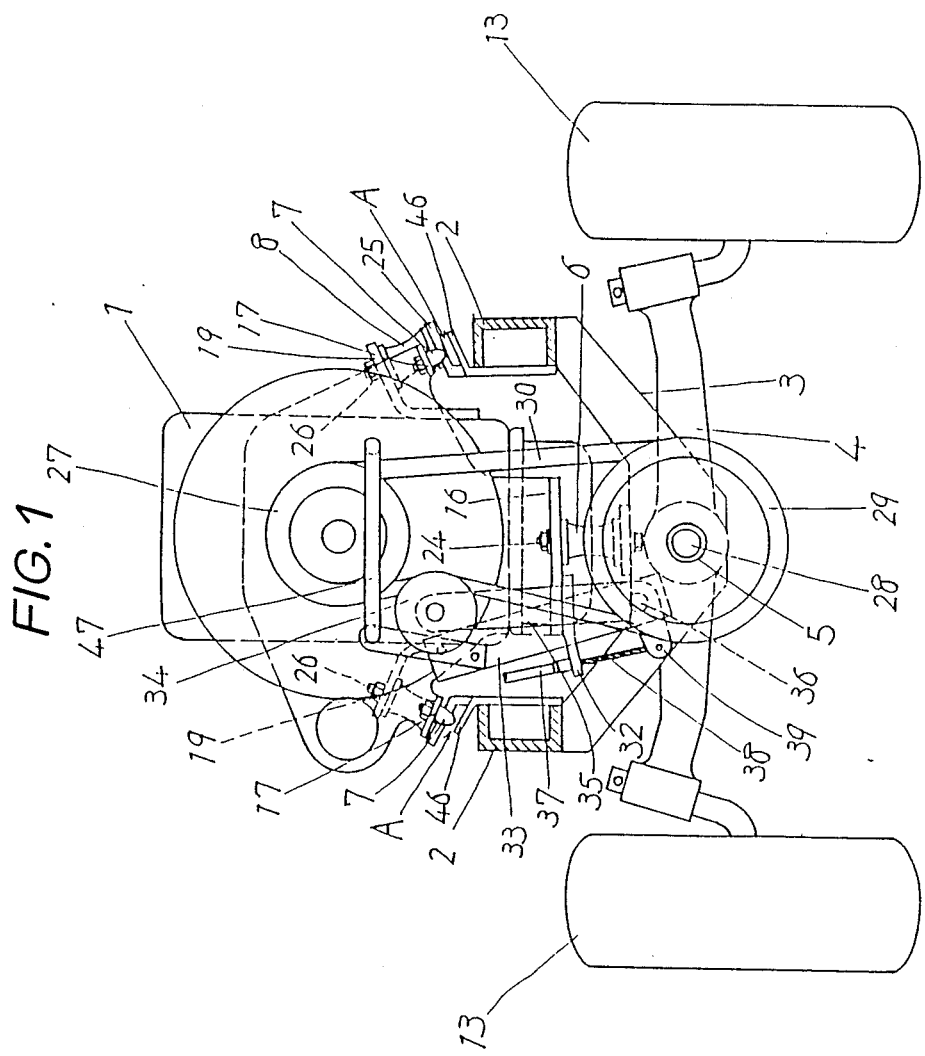
FIG. 1 is a partially sectioned front elevation of a principal portion.
Figure 2:
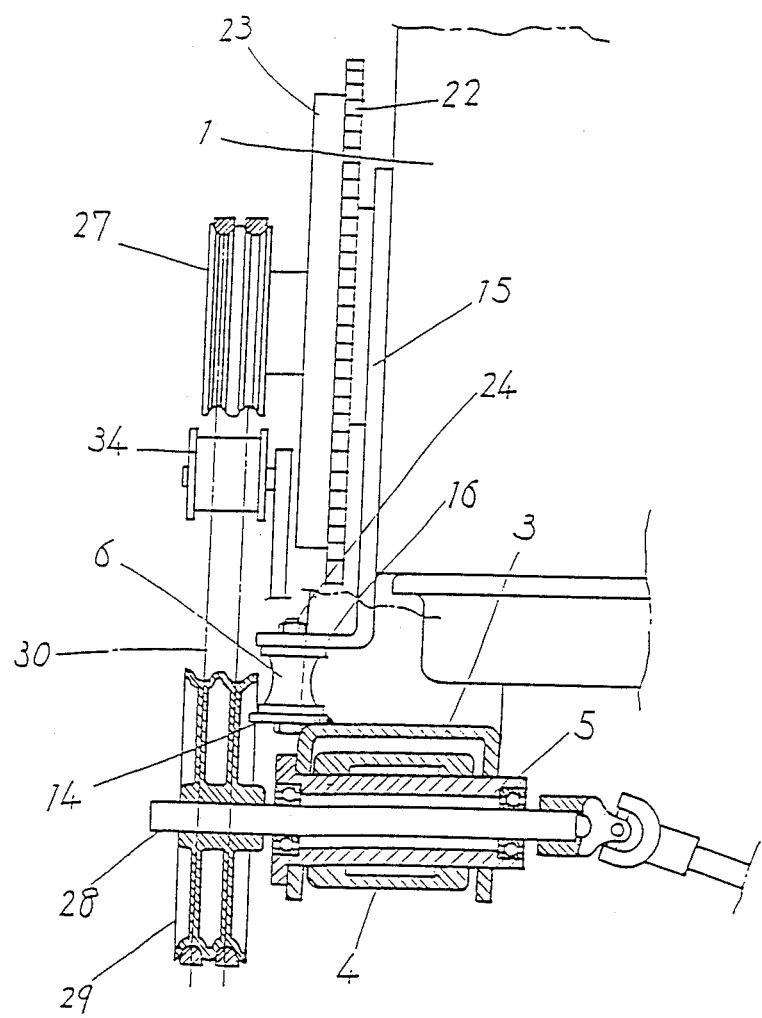
FIGS. 2 and 3 are partially sectioned side elevation of the principal portion.

An embodiment of the present invention will now be described in detail with reference to the drawings. The scope of the present invention is not limited to the dimensions, materials, shapes and relative arrangement of the constituent parts referred to in this embodiment unless there is any special statement about these conditions, and the conditions referred to in this embodiment are mere examples for describing the present invention.

The illustrated example is a vehicle 9 for a riding lawn mower with the present invention incorporated in the portion thereof on which an engine 1 is installed.

The main frames 2, 2 of the vehicle 9 for a lawn mower are provided at the left and right lower portions of a vehicle body so as to extend over substantially the whole length thereof. The front ends of the main frames 2, 2 are connected together by a front frame 10, and the rear ends thereof by a rear frame 11.

The engine 1 is provided on the front portions of the main frames 2, 2, and a transmission case 12 on the rear portions thereof.

Under the front portions of the left and right main frames 2, 2, a connecting frame 3 having a lower side-opened U-shaped side elevation extends downward so as to connect the main frames 2, 2 together.

A pivot 5, on which a front axle 4 is pivotably mounted, is provided in a laterally intermediate portion of the connecting frame 3 so as to cross the same. Front wheels 13, 13 for steering the vehicle are mounted rotatably on both end portions of the front axle 4.

A support plate 14 is provided in a forwardly projecting state on the portion of the connecting frame 3 which is above the rotatable shaft 5, and a single, central, front lower vibration proofing member 6 on the laterally intermediate portion of the support plate 14.

A front plate 15 is attached to the front surface of the engine 1, and a forwardly projecting front support seat 16 is provided at the lower end of the front plate 15. Front side support seats 17, 17 are provided in the same forwardly projecting state as the front support seat 16, at the left and right side portions of the front plate 15 which are substantially halfway between the upper and lower ends thereof.

Rear plates 18, 18 are attached to the left and right rear portions of the engine 1, and the rear endportions of these rear plates 18, 18 from rear side support seats 19, 19.

As illustrated in the drawings, the engine 1 is provided with a radiator 20 and a cooling fan 21 at the rear side thereof, and a flywheel 23 with a starting ring gear at the front side thereof. The front support seat 16 at the lower end portion of the front plate 15 attached to the front surface of the engine 1 is placed on the front lower vibration proofing member 6 and secured thereto via a locking means 24 consisting of a bolt and a nut.

The rear portion of the engine 1 is fixed to the main frames 2, 2 via the rear side vibration proofing members 8, 8 which are provided between the rear side support seats 19, 19 formed at the rear end portions of the left and right rear plates 18, 18 and the rear side support plates 25, 25 projecting diagonally upward to positions opposed to the upper surfaces of the corresponding portions of the main frames 2, 2, and which are secured via locking means 26, 26 consisting of bolts and nuts.

The vibration restricting members 7, 7 consisting of an elastic material are provided in a downwardly projecting state on the front side support seats 17, 17 formed at the portions of the front plate 15 which are substantially higher than the front lower vibration proofing member 6 and above the left and right main frames 2, 2 in such a manner that the quantity of projection of the vibration restricting members 7, 7 can be regulated.

The left and right restricting plates 46, 46 are provided above the portions of the main frames 2, 2 which are opposed to the vibration restricting members 7, 7, with clearances A left between the restricting plates 46, 46 and restricting members 7, 7.

A power picking-up driving pulley 27 is provided in front of a flywheel 23 for the engine 1, and a shaft 28 is inserted in the pivot 5. A driven pulley 29 is mounted on the front end portion of the shaft 28, and a driving member 30 consisting of a V-belt is set over the driving and driven pulleys 27, 29.

Figure 3:
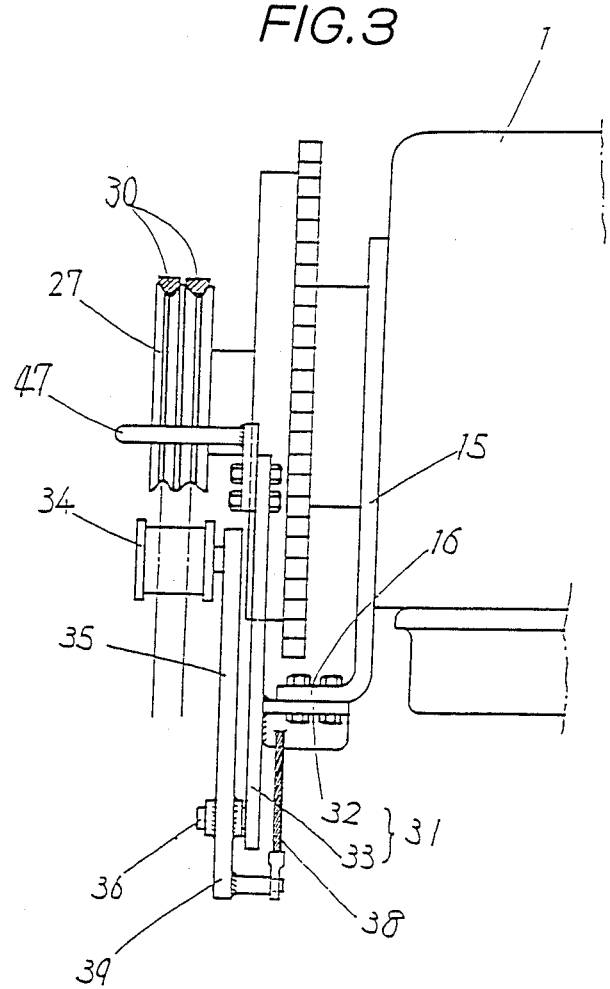
Figure 4:
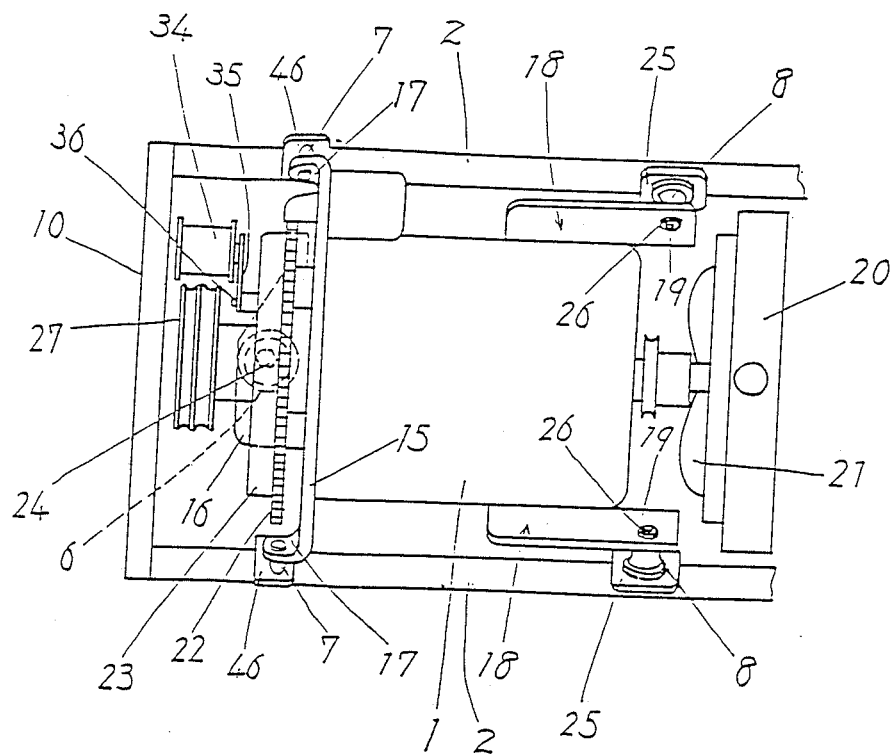
FIG. 4 is a plan view of the principal portion.
Figure 5:
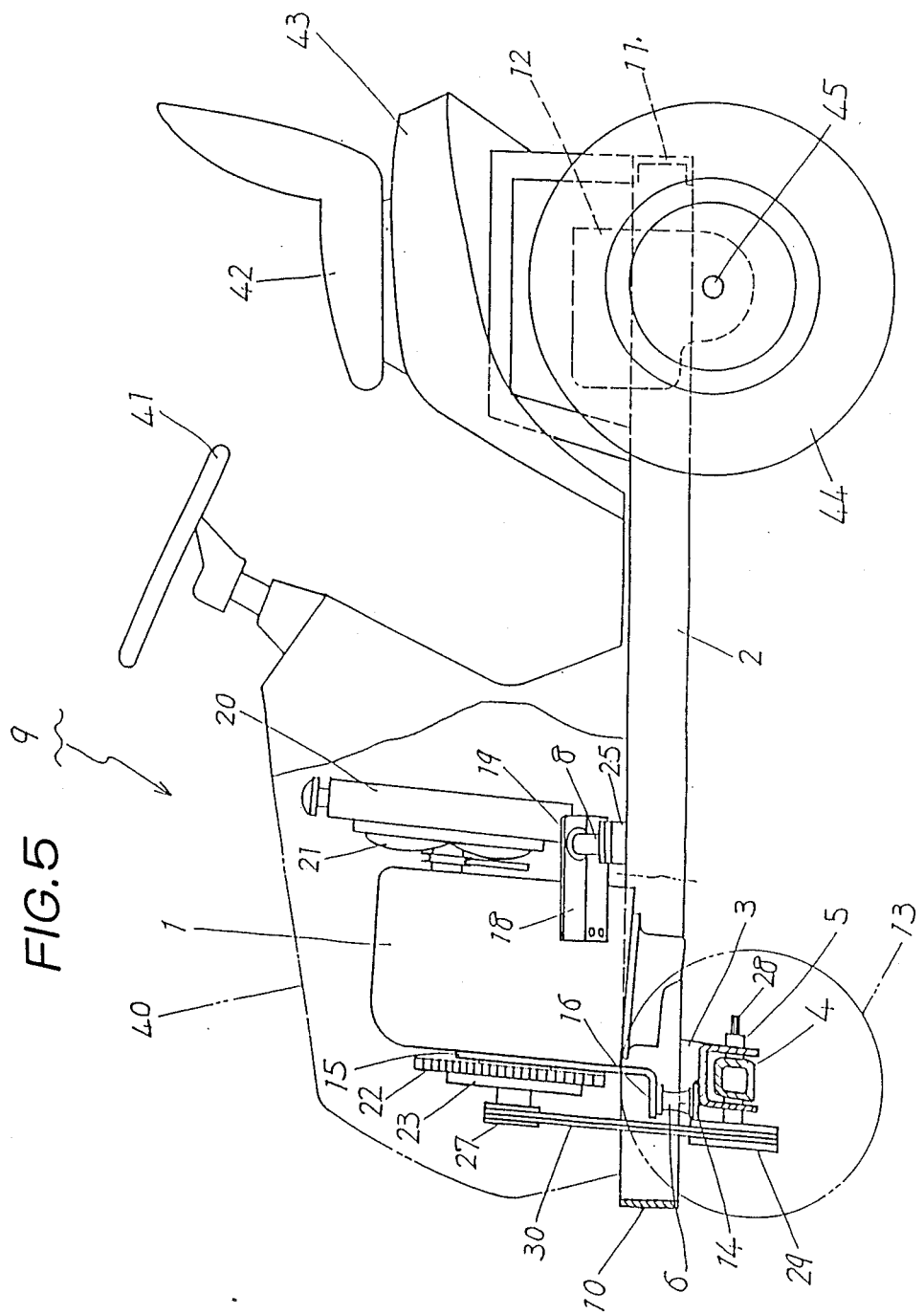
FIG. 5 is a partially sectioned general side elevation.

An auxiliary frame 31 shown in FIG. 3 is secured in a forwardly projecting state to the right-hand portion of the front support seat 16 formed at the lower end portion of the front plate 15 attached to the front portion of the engine 1.

This auxiliary frame 31 consists of a lateral plate 32 and a vertical plate 33, and an arm 35 supporting a tension pulley 34 for controlling the tension of the driving member 30 is supported pivotably 36 on the lower portion of the vertical plate 33.

A base end portion of a safety cover 47 covering both side portions of the driving pulley 27 and driving member 30 is fixed to the upper end portion of the vertical plate 33.

An outer flexible wire 37 is fastened to the right side portion of the lateral plate 32 shown in FIG. 1, and the lower end portion of an inner flexible wire 38 to a bell crank 39 formed at the lower end portion of the arm 35. When the inner wire 38 is drawn by an operating lever (not shown), the tension pulley 34 is pressed against the driving member 30. When the operating lever is operated so as to loosen the inner wire 38 greatly, the tension pulley 34 is separated from the driving means 30. Thus, these parts constitute a so-called tension clutch.

Reference numeral 40 denotes a bonnet, which covers the upper and both side portions of the engine 1.

Reference numeral 41 denotes a steering wheel, which is provided in front of a seat 42.

Reference numerals 43, 43 denote fenders, which cover the upper portions of the left and right rear wheels 44, 44.

The left and right rear wheels 44, 44 are mounted on driving axles 45, 45 projecting outside in the opposite lateral directions from the transmission case 12.

The engine 1 and transmission case 12 are operatively connected by a driving shaft (not shown).

A mowing means (not shown) having a mowing edge is provided between the front and rear wheels 13, 44 so that the mowing means can be vertically moved, which mowing means is driven by the shaft 28.

The operation of the illustrated embodiment will now be described.

When the engine 1 is running, it is vibrated greatly in the lateral direction by a crankshaft (not shown) provided so as to extend in the longitudinal direction.

The engine 1 is supported at its front, lower, central portion on the front lower vibration proofing member 6, and at its vertically intermediate rear portion on the left and right rear side vibration proofing members 8, 8, so that the engine 1 can move freely with its lateral vibrations and is not overly restricted.

This arrangement reduces the twisting movements of the main frames 2, 2 which are caused by the forward and backward movements thereof.

Even when the engine 1 is swung laterally, slackening or tension rarely occurs in the driving member 30 since the shaft 28 constituting a fulcrum of the swinging movements of the driving member 30 and the front lower vibration proofing member 6 constituting a fulcrum of the swinging movements of the engine 1 are positioned close to each other.

Moreover, since the tension pulley 34 for adjusting the tensile force of the driving member 30 is fixed to the front plate 15 which is swung simultaneously with the engine 1, the slackening or tensing effect on the driving member 30 rarely varies.

When the engine 1 vibrates excessively, the clearances A between the lower ends of the vibration restricting members 7, 7 and the upper surfaces of the left and right restricting plates 46, 46 extending above the main frames 2, 2 can be adjusted so as to lessen the large swinging movements.

The present invention is not, of course, limited to the above embodiment; it may be modified in various ways within the scope of the appended claims.

What is claimed is:

1. A vibration proofing support structure for an engine having driving and driven pulleys comprising:
   left and right multitudinally extending main frames;
   a connecting frame positioned toward the front of said engine near said driving and driven pulleys laterally connecting said left and right frames;
   a rotatable shaft connected to an intermediate portion of said connecting frame over the axis of said driven pulley;
   a front lower vibration proofing member attached to said intermediate portion of said connecting frame and said rotatable shaft whereby said vibration proofing member prohibits unwanted slackening and tightening of a drive belt connecting said driving and driven pulleys and transmits laterally twisting forces to the rear portion of the engine;

a first rear vibration proofing member adapted to attach the rear portion of said engine to one of said main frames; and a second rear vibration proofing member attached to the rear portion of said engine in the other of said main frames.

2. A vibration proofing support structure for an engine as in claim 1, further comprising:
an axle mounted on said shaft.

3. A vibration proofing support structure for an engine as in claim 1, further comprising:

front support means, attached to said main frame, for adjustably limiting the lateral travel of the front portion of said engine.

4. A vibration proofing support structure as in claim 3, further comprising:

tension clutch means associated with said driving and driven pulleys, for selectively engaging said driving and driven pulleys for transmitting torque therebetween.

* * * * *